(12) United States Patent
Peers-Smith

(10) Patent No.: US 10,442,613 B2
(45) Date of Patent: Oct. 15, 2019

(54) SHIELDED AIRFREIGHT CONTAINER

(71) Applicant: Kirintec Limited, Herefordshire (GB)

(72) Inventor: Roy Peter Peers-Smith, Herefordshire (GB)

(73) Assignee: KIRINTEC LIMITED, Herefordshire (GB)

( * ) Notice: Subject to any disclaimer, the term of this patent is extended or adjusted under 35 U.S.C. 154(b) by 0 days.

(21) Appl. No.: 15/906,723

(22) Filed: Feb. 27, 2018

(65) Prior Publication Data

US 2018/0273289 A1  Sep. 27, 2018

(51) Int. Cl.
*B65D 88/14* (2006.01)
*G06F 1/26* (2006.01)
*B65D 90/22* (2006.01)

(52) U.S. Cl.
CPC ............. *B65D 88/14* (2013.01); *B65D 90/22* (2013.01); *G06F 1/263* (2013.01); *B65D 2590/0083* (2013.01)

(58) Field of Classification Search
USPC ........................................................ 174/520
See application file for complete search history.

(56) References Cited

U.S. PATENT DOCUMENTS

| | | | | |
|---|---|---|---|---|
| 2,552,340 A * | 5/1951 | Moore | ............... | B65D 75/5833 229/5.82 |
| 3,430,759 A * | 3/1969 | Miller | .................. | A47B 61/06 206/291 |
| 3,495,756 A * | 2/1970 | Achermann | ....... | B65D 19/0016 108/51.3 |
| 3,955,700 A * | 5/1976 | Pedraza | ................. | B65D 88/14 220/1.5 |
| 4,098,424 A * | 7/1978 | Liebscher | .............. | B65D 88/14 220/1.5 |
| 4,520,925 A * | 6/1985 | Johnson | ............... | B65D 25/107 206/454 |
| 4,574,968 A * | 3/1986 | Mittelmann | ......... | B65D 90/021 220/1.5 |
| 4,685,563 A | 8/1987 | Cohen et al. | | |
| 4,802,600 A * | 2/1989 | Bretschneider | ........ | B65D 88/14 220/1.5 |
| 4,893,746 A * | 1/1990 | Swanhart | ............... | B65D 88/14 206/600 |

(Continued)

FOREIGN PATENT DOCUMENTS

EP  0163174 A1  12/1985
EP  2075837 A2  7/2009

*Primary Examiner* — Dimary S Lopez-Cruz
*Assistant Examiner* — Muhammad Azam
(74) *Attorney, Agent, or Firm* — DeLio Peterson & Curcio LLC; Thomas E. Ciesco

(57) ABSTRACT

A container has a base, sides and a top, the base, sides and top together defining a void within which items can be located in use, an electromagnetic shield fully surrounding at least part of the void to provide an electromagnetic shield between an exterior of the container and items located within the said part of the void, an antenna located within the said part of the void and a signal generator connected to the antenna and operable to apply a signal to the antenna to cause the transmission of an impeding signal within the said part of the void to impede the reception of signals transmitted from locations external to the container by items located within the said part of the void.

14 Claims, 1 Drawing Sheet

(56) References Cited

U.S. PATENT DOCUMENTS

| | | | |
|---|---|---|---|
| 5,669,524 A | 9/1997 | Loedel | |
| 5,712,789 A * | 1/1998 | Radican | G06Q 10/08 |
| | | | 700/226 |
| 5,838,759 A * | 11/1998 | Armistead | B66C 19/007 |
| | | | 378/57 |
| 6,252,159 B1 * | 6/2001 | Anagnos | H05K 9/0073 |
| | | | 174/377 |
| 7,317,387 B1 * | 1/2008 | Cova | B65D 90/008 |
| | | | 340/539.1 |
| 7,369,643 B2 * | 5/2008 | Kotowski | G01N 23/04 |
| | | | 378/197 |
| 7,486,768 B2 * | 2/2009 | Allman | G01V 5/0008 |
| | | | 378/147 |
| 9,481,512 B2 * | 11/2016 | Diniaco | B65D 90/0073 |
| 2003/0057131 A1 | 3/2003 | Diaferia | |
| 2004/0011789 A1 * | 1/2004 | Wang | B65D 88/14 |
| | | | 220/252 |
| 2004/0035139 A1 * | 2/2004 | Lindsey | B64D 9/00 |
| | | | 62/371 |
| 2004/0107823 A1 * | 6/2004 | Kiley | B65D 88/14 |
| | | | 86/50 |
| 2004/0124194 A1 * | 7/2004 | Beizai | H05K 5/04 |
| | | | 220/62.1 |
| 2005/0171856 A1 * | 8/2005 | Takahashi | G06Q 10/063 |
| | | | 705/330 |
| 2005/0275545 A1 * | 12/2005 | Alioto | B66C 19/002 |
| | | | 340/600 |
| 2005/0281999 A1 * | 12/2005 | Hofmann | B32B 5/18 |
| | | | 428/304.4 |
| 2009/0193835 A1 * | 8/2009 | Uluc | B64D 13/00 |
| | | | 62/407 |
| 2010/0101262 A1 * | 4/2010 | Uluc | B64D 13/00 |
| | | | 62/407 |
| 2010/0187228 A1 * | 7/2010 | Karpisek | B65D 88/14 |
| | | | 220/6 |
| 2010/0326216 A1 * | 12/2010 | Nacson | G01N 1/2226 |
| | | | 73/864.35 |
| 2011/0247356 A1 * | 10/2011 | Krosse | F25B 21/02 |
| | | | 62/457.1 |
| 2011/0247958 A1 * | 10/2011 | Lucas | B29C 70/521 |
| | | | 206/524.6 |
| 2014/0015641 A1 * | 1/2014 | White | G06K 7/10158 |
| | | | 340/10.1 |
| 2014/0015642 A1 * | 1/2014 | White | G06K 7/10168 |
| | | | 340/10.1 |
| 2014/0054196 A1 * | 2/2014 | Schaefer | H01M 2/1005 |
| | | | 206/703 |
| 2014/0117028 A1 * | 5/2014 | Huber | B65D 88/14 |
| | | | 220/600 |
| 2015/0069050 A1 * | 3/2015 | Naber | B65D 88/14 |
| | | | 220/1.5 |
| 2015/0144640 A1 * | 5/2015 | Kaya | B65D 88/14 |
| | | | 220/560.01 |
| 2015/0246749 A1 * | 9/2015 | Huber | B65D 19/0002 |
| | | | 108/50.02 |
| 2016/0039172 A1 * | 2/2016 | Kawka | B32B 5/024 |
| | | | 428/212 |
| 2016/0239802 A1 * | 8/2016 | Burch, V | H04W 4/70 |
| 2018/0141738 A1 * | 5/2018 | Armano | B65D 81/20 |
| 2018/0273289 A1 * | 9/2018 | Peers-Smith | B65D 88/14 |

* cited by examiner

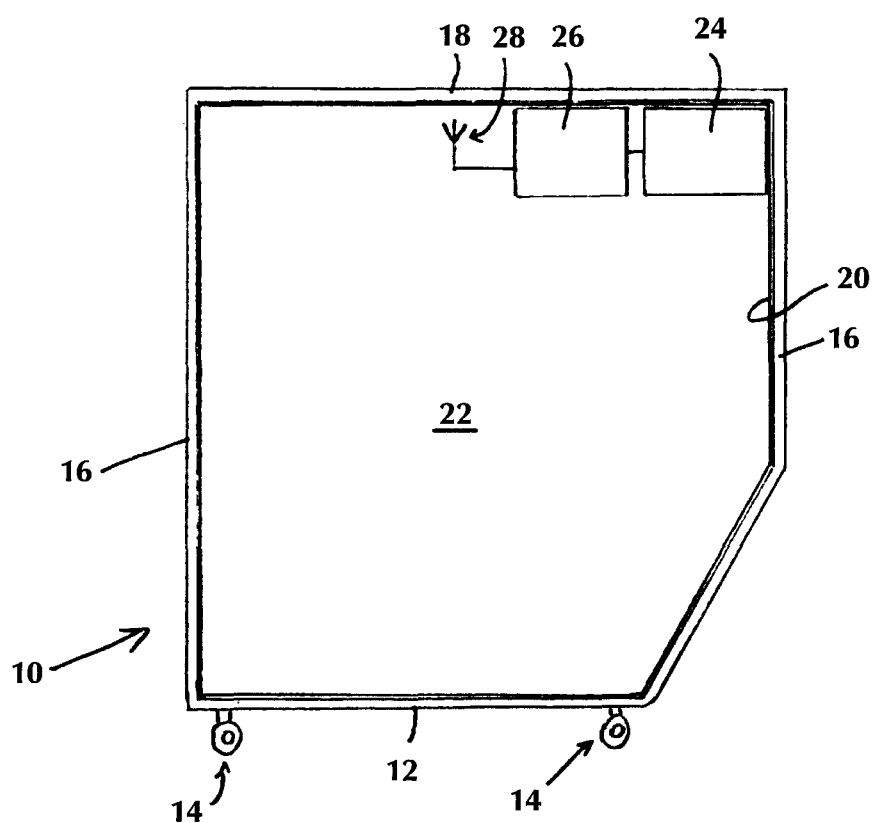

SHIELDED AIRFREIGHT CONTAINER

BACKGROUND OF THE INVENTION

1. Field of the Invention

This invention relates to a container, and in particular to a shipping or transportation container in which items are transported from one location to another. One specific example of a container with which the invention may be employed is an airfreight container used in the transportation of items in the holds of aircraft.

2. Description of Related Art

Aircraft have been targeted repeatedly by terrorists, and so a number of checks are undertaken before passengers and items are loaded onto or board an aircraft to ensure that unauthorised weapons or other items, explosive materials or the like are not brought into the aircraft. In the case of passengers, these checks typically involve the passengers passing through scanner devices, and any hand luggage carried by the passengers being inspected, again typically using a suitable scanning device. If any unauthorised materials are located then these are typically confiscated before the passenger is allowed to board the aircraft. In the case of items to be carried in the aircraft hold, a number of scanning checks may be undertaken on the luggage before it is loaded onto the aircraft.

Where items are confiscated from a passenger prior to boarding then, depending upon the nature of the items, the items may be disposed of or they may be permitted to be carried on board the aircraft in a location to which the passenger does not have access.

One concern is that if a confiscated item contains an improvised explosive device, the passenger may still be able to detonate the device even if the device is stored in a location to which the passenger does not have access.

SUMMARY OF THE INVENTION

It is an object of the invention to provide a container in which such items may be stored.

According to the present invention there is provided a container comprising a base, sides and a top, the base, sides and top together defining a void within which items can be located in use, an electromagnetic shield surrounding at least part of the void to provide electromagnetic shielding between an exterior of the container and items located within the said part of the void, an antenna located within the said part of the void and a signal generator connected to the antenna and operable to apply a signal to the antenna to cause the transmission of an impeding signal within the said part of the void to impede the reception of signals transmitted from locations external to the container by items located within the said part of the void.

It will be appreciated that by locating items within the void defined by the container, remote detonation of improvised explosive devices located within the void can be impeded.

The container preferably comprises an airfreight container, for example in the form of a so-called unit load device. Such a container is typically transported within the hold of the aircraft, and so items located therein are not accessible by passengers.

The sides and top of the container are preferably rigid. However, this need not always be the case and arrangements in which one or more of the sides of the container are of a flexible material, for example to allow access to the interior of the container, are also possible without departing from the scope of the invention.

The electromagnetic shielding layer is conveniently applied to a surface of, or contained within, each of the sides, the top and the base. Depending upon the material of the sides, top and/or base, the sides, top and/or base may themselves serve as the layer. For example, where the container is of aluminum form, no separate shield layer may be required.

All parts of the shield layer are preferably electrically connected to one another. This may be achieved simply by arranging for parts of the layer to contact one another. Such an arrangement forms a Faraday cage surrounding the items located in the void, impeding the reception by the items of signals transmitted from locations external to the container.

The signal generator is preferably located within the container.

The container preferably further comprises an internal power supply, for example in the form of a rechargeable battery or the like, operable to supply power to the signal generator. The capacity of the power supply is preferably sufficient to allow the signal generator to be powered throughout an extended period of time, for example for the duration of a trans-Atlantic flight.

It will be appreciated that as the antenna is located within the void, the shielding layer serves not only to impede reception by items located within the void of signals transmitted from locations external to the container, but also impedes reception by equipment located externally of the container of the impeding signal transmitted by the antenna. Accordingly, where used on an aircraft, the operation of the invention does not significantly interfere with the communications systems or control system associated with aircraft.

The container may be of wheeled form or include suitable rollers to aid maneuvering thereof. Alternatively, it may be arranged to be moved using specialised maneuvering equipment. It is conveniently provided with suitable fittings to aid securing of the container against undesired movement.

Provided the shielding layer provides a sufficiently good level of electromagnetic shielding to impede the reception of signals by items located in the void, the signal generator and antenna may be omitted. According to another aspect of the invention, therefore, there is provided a container comprising a base, sides and a top, the base, sides and top together defining a void within which items can be located in use, and an electromagnetic shield surrounding at least part of the void to provide electromagnetic shielding between an exterior of the container and items located within the said part of the void. The shield preferably comprises an additional shielding layer applied to or incorporated in the material of the base, sides and top.

BRIEF DESCRIPTION OF THE DRAWINGS

The invention will further be described, by way of example, with reference to the accompanying drawings, in which:

FIG. 1 is a diagrammatic representation of a container in accordance with an embodiment of the invention.

DESCRIPTION OF THE PREFERRED EMBODIMENT(S)

Referring to FIG. 1, an airfreight container 10 is illustrated diagrammatically. The container 10 comprises a base 12 supported upon wheels or rollers 14. The base 12 is of rigid form and is of a material and design sufficiently robust as to allow items to be transported within the container 10 to be supported thereon. As it is desirable, in aerospace applications, to keep weight to a minimum, the material of the base 12 is selected to keep the weight of the container 10 to a minimum whilst being of sufficient strength to bear the loads applied thereto, in use. The container 10 further comprises side walls 16 extending upwardly from the base 12, and a top 18. The walls 16 and top 18 are preferably of a thin sheet material, for example they may be of aluminum or of a plastics material, in order to be of low weight. In order to maintain a sufficient level of robustness, the side walls 16 and top 18 may be supported by an associated support framework (not shown) carried by the base 12. As is usual with airfreight containers, various fittings may be provided thereon to allow anchoring of the container 10 against movement when located within the hold of an aircraft.

At least one of the side walls 16 is movable or removable, for example taking the form of a hinged or sliding door, or comprising a flexible length of material that can be rolled up, in order to gain access to the interior of the container 10.

It will be appreciated that such a container is of substantially conventional form. By way of example it may take the form of a so-called unit load device.

In accordance with the invention, the base 12, side walls 16 and top 18 are each provided with a layer 20 of an electromagnetic shielding material. In the arrangement shown, the layer 20 is applied to an inner surface of each of the side walls 16, the top 18 and the base 12. However, this need not always be the case and arrangements are also possible in which the layer 20 is incorporated into the materials of the side walls 16, top 18 and base 12, or in which the layer is spaced inwardly from the sidewalls 16, top 18 and base 12, for example being suspended therefrom. Indeed, depending upon the material of the side walls 16, top 18 and base 12, no separate shielding layer 20 may be required, the side walls 16, top 18 and/or base 12 themselves serving as the shielding layer 20. By way of example, where the side walls 16, top 18 and base 12 are of aluminum then there may be situations in which no separate shielding layer is required. The parts of the layer 20 located upon, defined by or associated with each of the side walls 16, the top 18 and the base 12 are electrically interconnected with one another, together defining or forming a Faraday cage encompassing at least part of a void 22 defined within the container 10 by the base 12, side walls 16 and top 18.

If desired, the container 10 may be of materials selected to provide ballistic protection, preventing or restricting the escape of fragments from within the container 10 in the event of an explosion occurring therein.

Located within the void 22 is a power source in the form of a rechargeable battery 24. The battery 24 is used to supply electrical power to a signal generator 26 also located within the void 22. An antenna 28 is connected to an output of the signal generator 26, the antenna 28 being located within the void 22. The signal generator 26, powered by the battery 24, is operable to output an impeding signal for transmission by the antenna 28 into the void 22, the impeding signal serving to impede the reception by items located within the void 22 of signals transmitted from locations external to the container 10.

Whilst the signal generator 26 and battery 24 are illustrated as being located internally of the container 10, the container 10 preferably includes an external control panel (not shown) whereby operation of the signal generator 26 can be controlled, and an externally accessible charging port (not shown) whereby recharging of the battery 24 may be undertaken.

In use, items to be transported are stowed within the void 22 defined within the container 10. These items may comprise, for example, items confiscated from passenger's hand luggage, but the invention is not restricted in this regard and other items could be stowed therein. Indeed, if desired, all items carried in the hold of an aircraft could be stowed within containers of this type.

Once all of the items are located within the container 10, the side walls 16 are secured in a closed position, as required, to securely contain the items within the container 10. The action of closing and securing the side walls 16 ensures that the various parts of the layer 20 are brought into electrical contact with one another so as to ensure that the layer 20 forms a Faraday cage surrounding the items located within the container 10.

The container 10 is transported to the aircraft and is stowed in the hold of the aircraft. By way of example, it may be moved around within the aircraft hold using the wheels 14. However, this need not always be the case and other equipment may be used to aid movement of the container 10 into position. Once correctly positioned, straps or the like may be used to anchor the container 10 against movement.

The signal generator 26 is switched on to cause the transmission of an impeding signal within the void 22, the signal generator 26 being electrically powered by the battery 24.

It will be appreciated that, in use, the layer 20 serves to impede the reception by items located within the container of electromagnetic signals transmitted from a location external to the container. Furthermore, the transmission of the impeding signal within the void 22 serves to reduce the likelihood of such signals transmitted from locations external to the container 10 being received by items located within the void 22. Accordingly, if the items include an improvised explosive device arranged to be detonated in response to the receipt of a triggering electromagnetic signal, the likelihood of such a triggering signal being received is reduced, and so the likelihood of the device being detonated is reduced. Clearly, therefore, the security of the aircraft is enhanced.

The security benefits outlined hereinbefore are achieved without significantly impacting upon the normal operation of the aircraft as the layer 20 further serves to contain the impeding signal transmitted by the signal generator 26 and antenna 28. Communications equipment and control equipment associated with the aircraft are thus not significantly affected by the presence of the container 10.

As the impeding signal is contained within the void 22, rather than being transmitted over relatively long distances, it will be appreciated that signal transmission power may be relatively low. Accordingly, the power consumption of the signal generator 26 may also be relatively low.

Where used on aircraft which fly over extended distances, for example transatlantic flights, the battery 24 is preferably designed to be of capacity sufficient to ensure that the signal generator can be powered for the entirety of the flight, for example for 8-10 hours between charges. Indeed, it may be preferable for the battery to have a larger capacity than this in order to allow for longer routes, situations where recharging of the battery may not be possible, or flight delays.

Whilst the description hereinbefore relates to an arrangement including a signal generator and an antenna, if a good enough level of electromagnetic shielding is provided these components may be omitted whilst still impeding the reception of triggering signals by items located within the container, and the invention extends to such arrangements.

Whilst described in relation to an airfreight container for use on a passenger carrying aircraft, it will be appreciated that the invention is not restricted to such use. It could be employed on freight only carrying aircraft, or in other applications such as on railways, ships, lorries and the like.

Although a specific embodiment of the invention has been described hereinbefore, a number of modifications and alterations may be made thereto without departing from the scope of the invention as defined by the appended claims.

Thus, having described the invention, what is claimed is:

1. A container comprising a base, sides and a top, the base, sides and top together defining a void within which items can be located in use, an electromagnetic shield fully surrounding at least part of the void to provide the electromagnetic shield between an exterior of the container and items located within the said part of the void, an antenna located within the said part of the void and a signal generator connected to the antenna and operable to apply a signal to the antenna to cause a transmission of an impeding signal within the said part of the void to impede a reception of signals transmitted from locations external to the container by items located within the said part of the void.

2. A container according to claim 1, wherein the container comprises an airfreight container.

3. A container according to claim 2, wherein the container comprises a unit load device.

4. A container according to claim 1, wherein the sides and top of the container are rigid.

5. A container according to claim 1, wherein at least one of the sides is of a flexible material.

6. A container according to claim 1, wherein the electromagnetic shielding layer is applied to a surface of, or contained within, each of the sides, the top and the base.

7. A container according to claim 1, wherein a material of the sides, base and top serves as the shield.

8. A container according to claim 7, wherein the material comprises aluminum.

9. A container according to claim 1, wherein all parts of the shield layer are electrically connected to one another.

10. A container according to claim 1, wherein the signal generator is located within the container.

11. A container according to claim 1 and further comprising an internal power supply operable to supply power to the signal generator.

12. A container according to claim 11, wherein the power supply comprises a rechargeable battery.

13. A container according to claim 1, and further comprising a control panel accessible from the exterior of the container for controlling an operation of the signal generator.

14. A container according to claim 1, wherein the base, sides and top of the container are of materials selected to provide ballistics protection.

* * * * *